United States Patent [19]

Müller et al.

[11] Patent Number: 5,388,616
[45] Date of Patent: Feb. 14, 1995

[54] INVERTIBLE LINER FOR INTERNAL SURFACES OF FLUID CONVEYING PIPES AND THE LIKE

[76] Inventors: Hans Müller, Brauergildestrasse 5, W-4938 Schieder-Schwalengerg 2; Hermann Suerbaum, Lange Äckernstrasse 14, W-4938 Schieder-Schwalenberg, both of Germany

[21] Appl. No.: 278,184

[22] Filed: Jul. 21, 1994

Related U.S. Application Data

[63] Continuation of Ser. No. 64,711, May 19, 1993, abandoned.

[51] Int. Cl.⁶ .............................................. F16L 55/16
[52] U.S. Cl. ...................... 138/98; 138/104; 264/269
[58] Field of Search ................... 138/97, 98, 104; 264/269, 516

[56] References Cited

U.S. PATENT DOCUMENTS

| | | | |
|---|---|---|---|
| 4,135,958 | 1/1979 | Wood | 138/97 |
| 4,456,401 | 6/1984 | Williams | 138/97 |
| 4,714,095 | 12/1987 | Müller et al. | 138/98 |
| 4,752,511 | 6/1988 | Driver | 138/98 |
| 4,758,454 | 7/1988 | Wood | 138/98 |
| 4,778,553 | 10/1988 | Wood | 138/98 |
| 4,836,715 | 6/1989 | Wood | 138/98 |
| 5,010,440 | 4/1991 | Endo | 138/98 |
| 5,223,204 | 6/1993 | Endoh | 138/97 |
| 5,225,121 | 7/1993 | Yokoshima | 138/97 |
| 5,265,648 | 11/1993 | Lyon | 138/98 |
| 5,280,811 | 1/1994 | Catallo et al. | 138/98 |
| 5,334,429 | 8/1994 | Imoto et al. | 138/98 |

*Primary Examiner*—David A. Scherbel
*Assistant Examiner*—James F. Hook
*Attorney, Agent, or Firm*—Darby & Darby

[57] ABSTRACT

An invertible tubular substrate of resin-permeated fibrous material is surrounded by an impermeable tubular film which, in turn, is surrounded by an impermeable tubular calibrating element. One end of the substrate is inserted into one end of a pipe which is to be lined from the inside, and the assembly of substrate, film and calibrating element is thereupon inverted into the pipe wherein the substrate is immediately adjacent the internal surface of the pipe and surrounds the film. The calibrating element is separable from the film and can be withdrawn from the interior of the inverted film by a flexible cord. The resin in the substrate sets upon inversion and maintains the inverted substrate in contact with the internal surface of the pipe.

6 Claims, 4 Drawing Sheets

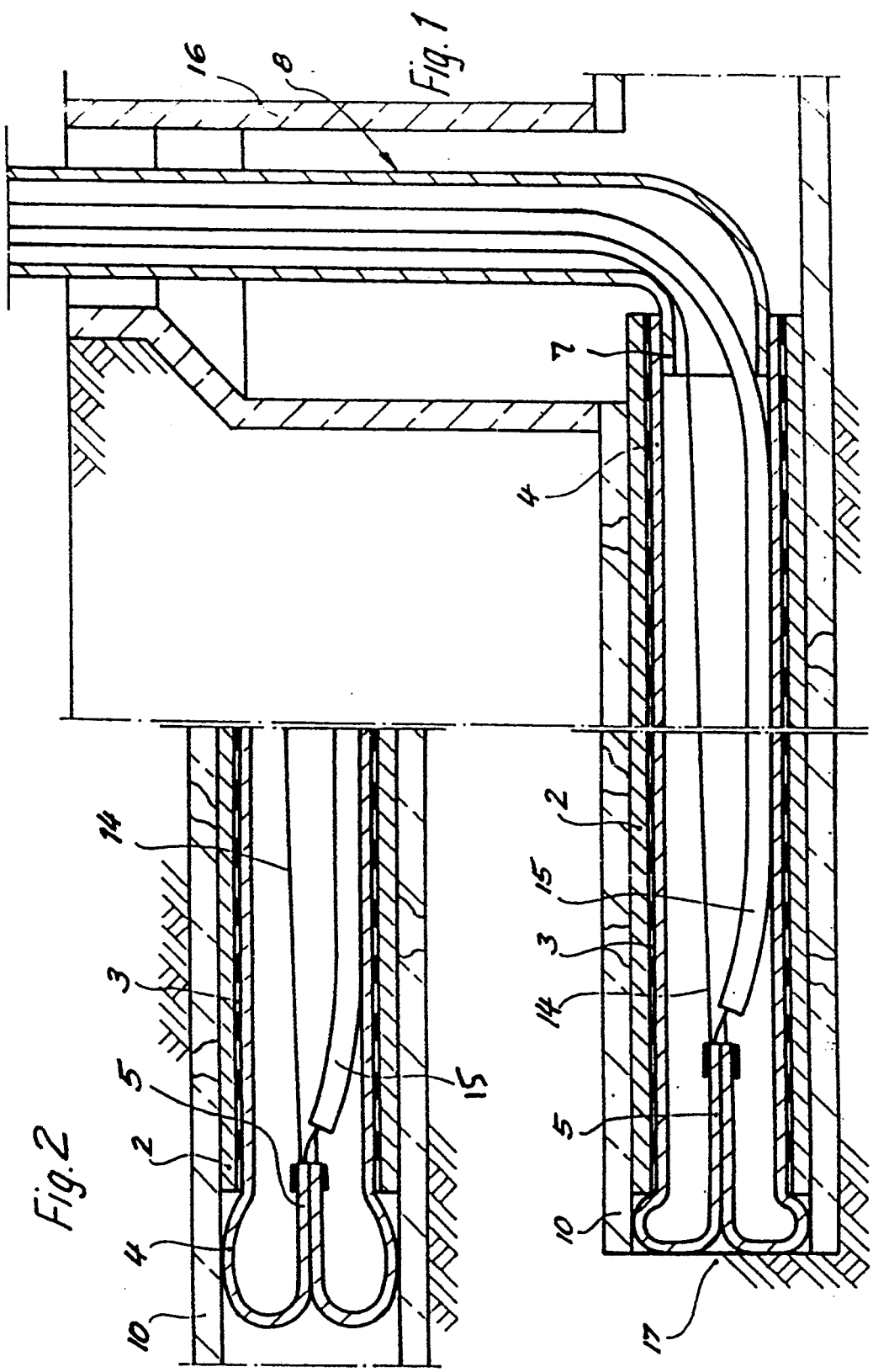

INVERTIBLE LINER FOR INTERNAL SURFACES OF FLUID CONVEYING PIPES AND THE LIKE

This is a continuation of application Ser. No. 08/064,711, filed May 19, 1993, now abandoned.

CROSS-REFERENCE TO RELATED CASE

The liner of the present invention can be applied by apparatus of the type disclosed in commonly owned U.S. Pat. No. 5,322,653 patented on Jun. 21, 1994 by Hans Müller. The disclosure of the copending application is incorporated herein by reference.

BACKGROUND OF THE INVENTION

The invention relates to improvements in liners for the internal surfaces of water mains, pipes which branch off water mains, sewage lines and/or other types of conduits which are not readily accessible. More particularly, the invention relates to improvements in liners for the internal surfaces of pipes including those which are accessible at a single location, e.g., at one end.

It is already known to provide the internal surface of a pipe with a liner (e.g., to seal a leak in the pipe) which contains a hardenable resin-permeated substrate adapted to be inverted into a pipe and to be thereupon caused or permitted to harden as a result of setting of the resin. A drawback of heretofore known proposals is that the pipe which is to be repaired must be accessible at two spaced-apart locations. This creates many problems and contributes to the cost of the repair work because a second access to the pipe must be established for the sole purpose of introducing the liner into a damaged portion of the pipe. The resin-impregnated substrates which are used for such proposals are known as softliners. A softliner is a flexible tube of fibrous material which is permeated with a suitable resin and the tube can be introduced into a damaged pipe by resorting to a winch or by inversion. The inserted pipe is thereupon heated (e.g., as a result of exposure to ultraviolet radiation, ambient temperature or exchange of heat with a hot fluid) so that the resin sets and the outside of the hardened liner closely follows the internal surface of the pipe. The just outlined procedure cannot be relied upon in many instances when a pipe which is to be lined from the inside is accessible at a single location, e.g., at one end. This applies for nearly all branch lines of water mains and sewage pipes for delivery of fresh water into or for evacuation of sewage from private homes, apartment houses and numerous other establishments. Furthermore, this also embraces all types of pipes, lines, mains and other conduits having dead ends.

OBJECTS OF THE INVENTION

An object of the invention is to provide a novel and improved liner which can be used to coat the internal surface of a hard-to-reach pipe, particularly a pipe which is buried in the ground or is concealed in the wall of a private home or any other building.

Another object of the invention is to provide a liner which can be introduced into a hard-to-reach pipe in a simple and time-saving manner.

A further object of the invention is to provide a liner which renders it possible to coat the internal surface of a pipe having a dead end.

An additional object of the invention is to provide a novel and improved method of manipulating the aforedescribed liner.

Still another object of the invention is to provide a liner which can be inserted into a pipe in a novel and improved way.

A further object of the invention is to provide the liner with a novel and improved protective film which reduces the likelihood of damage to the substrate during setting of resin and which permits convenient separation of the substrate from the part or parts serving to facilitate introduction of the substrate into a pipe.

Another object of the invention is to provide a liner which can be introduced into a hard-to-reach pipe by the simple expedient of turning it inside out.

SUMMARY OF THE INVENTION

The invention is embodied in a coat or liner for internal surfaces of fluid-conveying pipes (such as water mains, branches of water mains, sewage pipes and the like). The improved liner comprises a resin-permeated hardenable invertible tubular substrate having a distal end insertable into a pipe which requires an internal coat or liner, an impermeable tubular flexible invertible film which (prior to inversion of the substrate) surrounds the external surface of the substrate, and an invertible impermeable tubular calibrating element which (prior to inversion of the substrate) surrounds and is movable relative to the film. The calibrating element has a proximal end which extends beyond the proximal end of the substrate, and a distal end at the distal end of the substrate.

The improved liner can further comprise means (e.g., a cable, a cord, a rope or the like) for separating the calibrating element from the film. The separating means comprises a flexible member which is connected to the proximal end of the calibrating element.

The calibrating element can contain a polyester. For example, the calibrating element can consist of coated polyester fibers.

The liner can be furnished with means for promoting the hardening of the substrate subsequent to inversion in a pipe. Such promoting means can comprise a hose or other suitable means for conveying a heated gaseous or hydraulic fluid into the calibrating element at the proximal end of such element.

The substrate and the calibrating element can define a plenum chamber which is bounded in part exclusively by the calibrating element.

The novel features which are considered as characteristic of the invention are set forth in particular in the appended claims. The improved liner itself, however, both as to its construction and the mode of using the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a central vertical sectional view of a branch pipe having a dead end and an internal surface coated by a liner embodying one form of the present invention, the calibrating element being ready to be withdrawn from the interior of the film within the inverted substrate by a cord and the resinous substance in the substrate being heated by a fluid supplied by a conduit extending into the calibrating element;

FIG. 2 is a similar sectional view of a pipe with a liner of the type shown in FIG. 1;

DESCRIPTION OF PREFERRED EMBODIMENT

Figure 3:
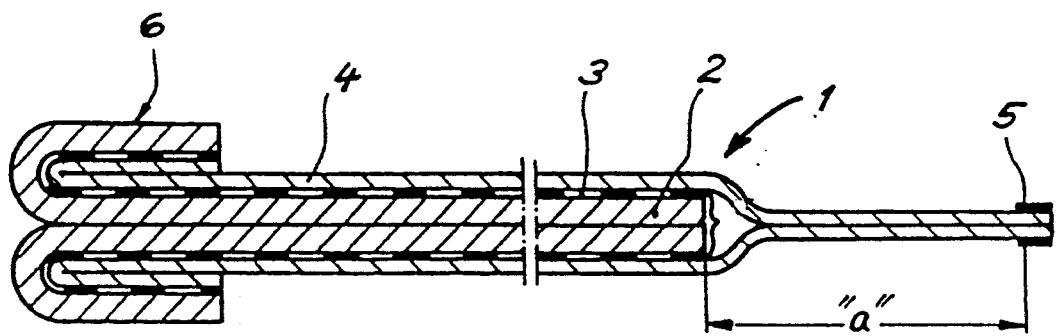
FIG. 3 is a fragmentary central longitudinal sectional view of a non-inverted liner.

FIG. 3 shows a flexible liner or coat 1 which comprises a resin-permeated tubular substrate 2 of fibrous material, an impermeable tubular film 3 of rubber or a plastic material which surrounds the substrate 2, and a tubular calibrating element or an impermeable flexible sizing tube 4 made of impermeable plastic or other suitable material and surrounding the film 3. The external surface of the substrate 2 adheres to the internal surface of the film 3 but the external surface of the film 3 is movable relative to the internal surface of the calibrating element 4. The proximal end 5 of the calibrating element 4 is closed and sealed and extends a distance a beyond the proximal ends of the substrate 2 and film 3. The distal ends of the substrate 2, film 3 and calibrating element 4 are inverted (i.e., turned inside out), as at 6, so that the distal end of the film 3 is surrounded by the distal end of the substrate 2 and surrounds the distal end of the calibrating element 4. The film 3 is impermeable to gaseous and hydraulic fluids.

Figure 4:
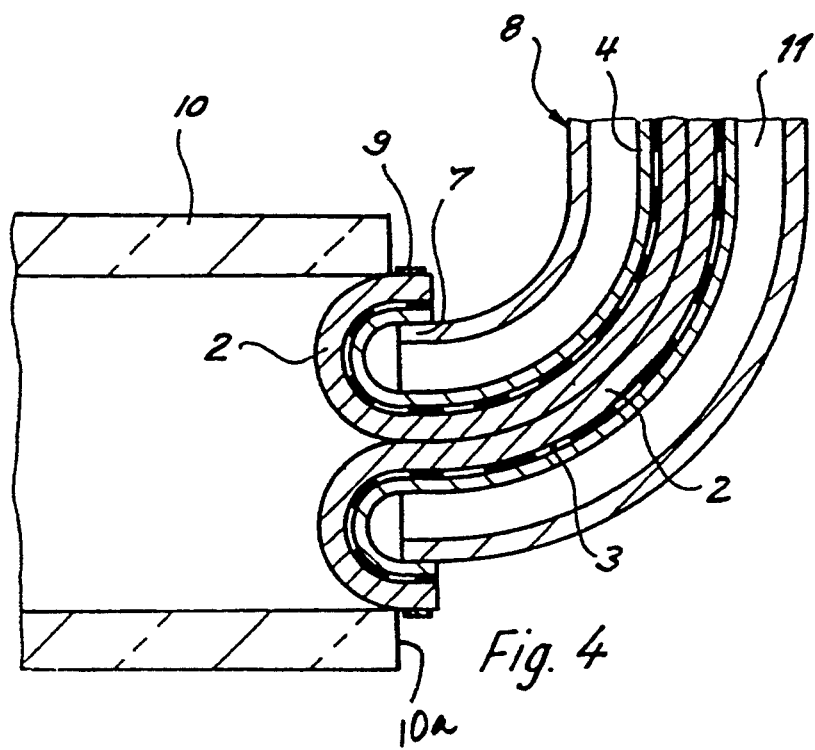
FIG. 4 shows a portion of a liner of the type illustrated in FIG. 3 during the initial stage of inversion and simultaneous introduction into one end of a pipe.

The liner 1 can be introduced into one end 10a of a pipe or line 10 in a manner as shown in FIG. 4. A clamping device 9 is employed to hold the inverted distal ends of the three components 2, 3, 4 of the liner 1 together and to serve as a stop which prevents the inverted distal end of the substrate 2 from entering the end 10a. The clamping device 9 spacedly surrounds the adjacent discharge end 7 of a tubular inverting tool 8 which receives the major part of the liner 1. The calibrating element 4 and the tool 8 define an elongated plenum chamber 11 which is surrounded by the internal surface of the tool 8. When an operator decides to admit a pressurized gaseous or hydraulic fluid into the chamber 11, the outturned distal end of the calibrating element acts not unlike a piston, i.e., it penetrates into the pipe 10 and simultaneously inverts the substrate 2 and the film 3 so that the previously internal surface of the substrate 1 becomes its external surface and closely follows the outline of the internal surface of the pipe 10. At the same time, the previously internal surface of the film 3 becomes its external surface and closely follows the outline of the internal (previously external) surface of the substrate 2. The calibrating element 4 is also inverted and is surrounded by the film 3 (see FIGS. 1 and 2).

The inverted substrate 2 is thereupon caused or permitted to harden, i.e., the resin which permeates the fibrous material of the substrate is caused or permitted to set. Thus, the substrate 2 becomes a self-supporting internal liner which closely follows the outline of the internal surface of the pipe 10 and prevents the escape of a flowable medium which is conveyed through the pipe 10. Such sealing action is attributable to impermeability of the hardened substrate 2 and/or to impermeability of the film 3 which adheres to the internal surface of the inverted substrate. The film 3 prevents the calibrating element 4 from directly contacting the substrate 2, i.e., the resin which permeates the substrate cannot influence the movability of the film 3 and the calibrating element 4 relative to each other. This holds true prior as well as subsequent to hardening of the substrate 2.

Figure 5:
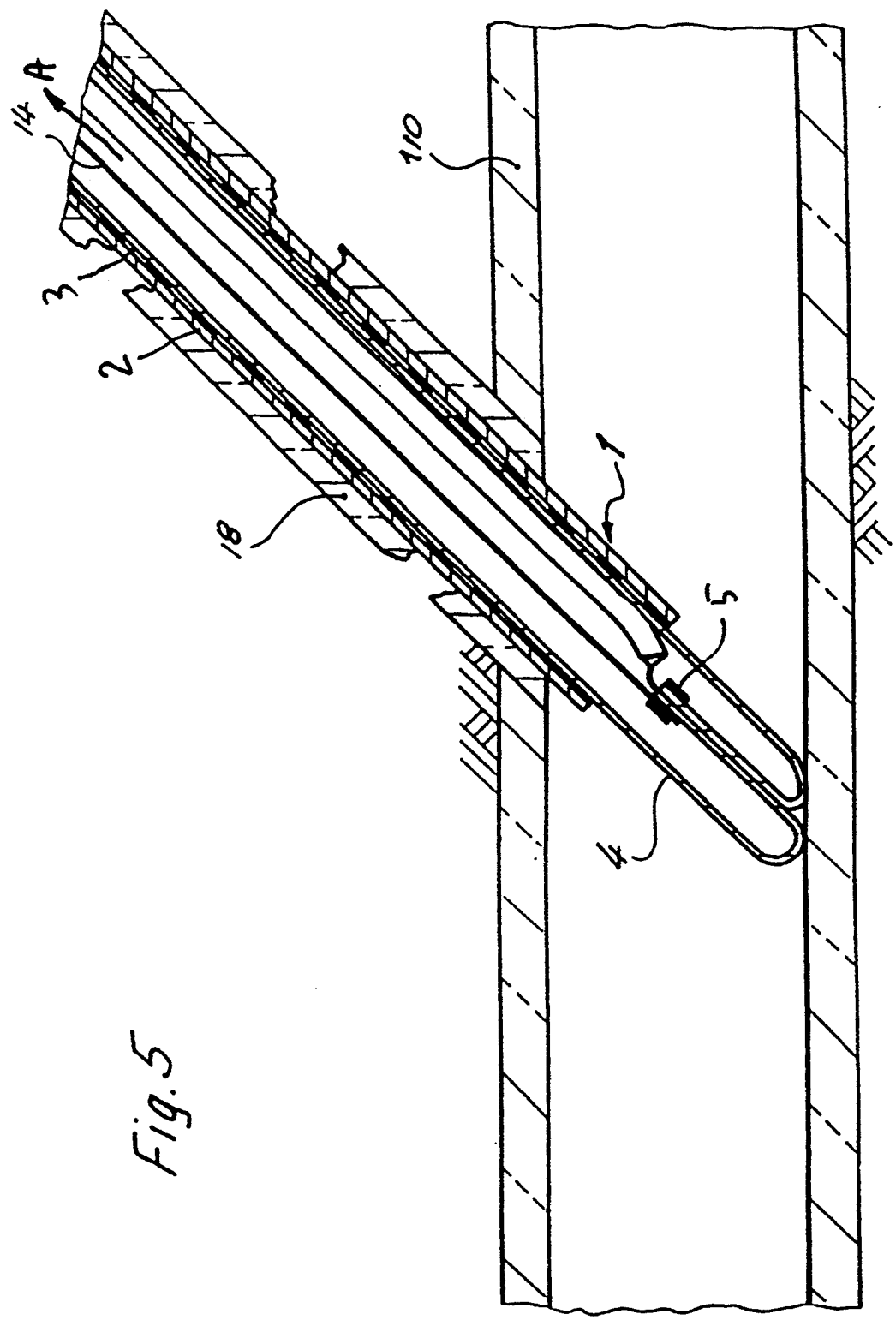
FIG. 5 is a sectional view of a main line and a branch pipe connected to and communicating with the main line, a liner being shown in a fully inserted condition in which its substrate contacts the internal surface of the branch pipe.
Figure 6:
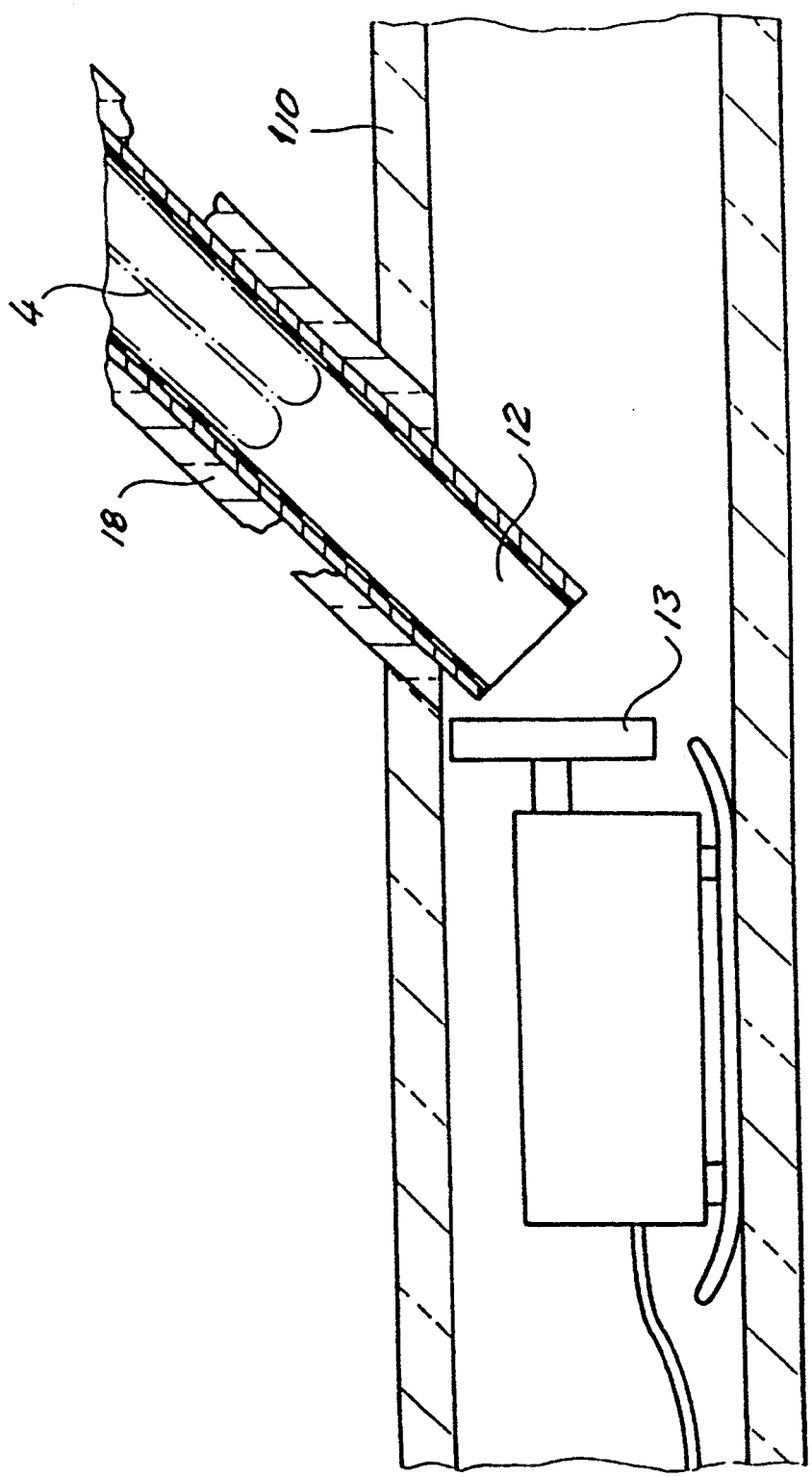
FIG. 6 illustrates the structure of FIG. 5 and a tool which is inserted into the main line to remove the surplus of the substrate.

FIGS. 5 and 6 show that the improved liner 1 can be installed in a branch pipe 18 which is connected to and extends at an acute angle from a main line 110. As can be seen in FIG. 5, the formerly proximal end 5 of the inverted calibrating element 4 has become its distal end and the formerly proximal ends of the substrate 2 and film 3 become the distal ends which extend beyond the branch line 18 and into the main line 110. The inverted calibrating element 4 is inverted again while being drawn upwardly and toward the open end of the branch pipe 18 (this is achieved by pulling the flexible element 14, and hence the originally proximal end 5 of the element 4, in the direction of arrow A). A material removing tool 13 (e.g., a grinder) is thereupon introduced into the main line 110 (see FIG. 6) to advance past the junction of the line 110 and pipe 10 and to remove the surplus 12 of the hardened substrate 2 and film 3. The extracted (twice inverted) calibrating element 4 is ready for renewed use.

FIG. 1 shows the fully installed liner in the interior of a pipe 10 branching off an upright duct 16 and having a dead (closed) end 17. The calibrating element 4 is ready to be extracted from the inverted film 3 by an elongated flexible member 14 (e.g., a cable, cord, wire, rope or the like) and a tubular heating member 15 conveys a hot or heated gaseous or hydraulic fluid which heats the calibrating element 4 from within. The element 4 heats the substrate 2 through the film 3 so that the resin which permeates the fibrous material of the substrate 2 sets and the substrate thereupon retains its expanded condition in which it closely follows the outline of the internal surface of the branch pipe 10.

The flexible member 14 is affixed to the closed and sealed end 5 of the calibrating element 4, the same as the heating member 15. The space at the righthand ends of the inverted substrate 2 and film 3 is sealed by the adjacent end 7 of the inverting tool 8 in the duct 16; this prevents escape of heated fluid from the interior of the once inverted calibrating element 4. The heating member 15 is withdrawn from the interior of the inverted film 3 jointly with the flexible member 14 and calibrating element 4 so that these parts can be reused at another location.

FIG. 2 shows that the liner need not extend all the way to a dead end of the pipe 10, i.e., the liner can be applied to an intermediate portion of the internal surface of the pipe 10. The construction of the liner and of the parts 14, 15 shown in FIG. 2 is or can be the same as in FIG. 1.

As used herein, the term "resin" is intended to embrace all hardenable substances which can be caused to permeate the substrate 2 while in a liquid or flowable state and which can set at normal temperature or at an elevated temperature (and/or at a normal pressure or above atmospheric pressure) in order to impart to the substrate a hardness which is necessary in a buried pipe line, sewage line or elsewhere under circumstances as outlined above. The condition of the resin which permeates the substrate 2 prior to inversion of the substrate is such that the resin does not interfere with inversion, e.g., in a manner as described with reference to FIG. 4.

The calibrating element 4 is preferably made of a very thin or extremely thin plastic material which undergoes little or no elongation during repeated inversion. This calibrating element can be reused (with the flexible member 14 and heating member 15) because it need not be affixed to the adjacent surface of the film 3. The material of the calibrating element 4 can be reinforced by filaments or in any other suitable way so that it can be inverted and reinverted with a minimum of stretching in the longitudinal direction or with no stretching at all. For example, the element 4 can be made, at least in part, of a polyester, e.g., of suitably coated polyester filaments.

The internal space or chamber 11 can receive a column of liquid (e.g., water) in order to turn the element 4 inside out as shown in FIG. 4. Alternatively, the chamber 11 can receive a compressed gaseous or hydraulic fluid (e.g., air) which is admitted at a variable or fixed rate in order to invert the calibrating element 4 and to thus invert the substrate 2 and the tubular film 3.

FIGS. 1 and 2 show that the calibrating element 4 can be caused to advance into a pipe 10 beyond the substrate 2 and the film 3. Thus, in FIG. 4 the element 4 extends all the way to the closed and sealed end 17 of the pipe 10 while the inverted substrate 2 terminates short of the end 17. In FIG. 2, the element 4 also extends to the left beyond the inverted substrate 2 and the inverted film 3. It is presently preferred to select the characteristics of the calibrating element 4 in such a way that it can stand internal pressures in the range of at least 3 bar. The reason that the element 4 should preferably be made of a material (such as polyester) which can resist elongation of the element 4 is that the latter should be capable of resisting bursting stresses in regions (such as in the leftmost portions of the pipes 10 shown in FIGS. 1 and 2) where the element 4 is not surrounded by the substrate 2.

An important advantage of the improved liner is its simplicity. Furthermore, the liner can be introduced into hard-to-reach pipes, pipe lines and other conduits. Still further, the parts 4, 14, 15 of the liner can be reused once or more than once. The characteristics of the substrate 2 and of the film 3 can be selected practically at will, and the inverted, expanded and hardened substrate closely follows the outline of the internal surface of a pipe or any other conduit which receives the improved liner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A tubular liner for internal surfaces of fluid-conveying pipes which are accessible from only one axial end, comprising a resin-permeated hardenable tubular substrate which is open at both a proximal end and a distal end, and has an outer impermeable flexible coating layer bonded to said tubular substrate, said impermeable outer coating layer being surrounded by an impermeable flexible sizing tube which is moveable with respect to said impermeable outer coating layer, said sizing tube being spaced from said tubular substrate by said impermeable outer coating layer to prevent said resin from contacting said sizing tube, said sizing tube having a distal end and a proximal end that extends beyond the proximal end of the tubular substrate by a predetermined length where said proximal end of said sizing tube is closed and sealed, said distal end of said tubular substrate being inverted such that said outer coating layer distal end is surrounded by the distal end of the tubular substrate and surrounds the distal end of the sizing tube, a clamping member surrounding the distal end of said tubular substrate, a tubular inverting tool being surrounded by the distal end of the sizing tube such that the distal ends of said tubular substrate, said outer coating layer and said sizing tube are disposed between said clamping member and said tool; means for causing the inversion, by application of fluid pressure, of the tubular substrate until the sizing tube emerges from said proximal end of the tubular substrate causing any further inversion to stop and permitting said resin-permeated tubular substrate to harden.

2. The liner of claim 1, further comprising means for extracting said sizing tube from said tubular substrate.

3. The liner of claim 1, wherein said sizing tube contains a polyester.

4. The liner of claim 3, wherein said sizing element consists of coated polyester fibers.

5. The liner of claim 1, further comprising means for promoting hardening of said tubular substrate in said pipe.

6. The liner of claim 5, wherein said promoting means includes conveying a heated fluid into said sizing tube at the proximal end thereof.

* * * * *